US006804646B1

(12) United States Patent
Schneider

(10) Patent No.: US 6,804,646 B1
(45) Date of Patent: Oct. 12, 2004

(54) METHOD AND APPARATUS FOR PROCESSING A SOUND SIGNAL

(75) Inventor: Tobias Schneider, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/646,593

(22) PCT Filed: Mar. 8, 1999

(86) PCT No.: PCT/DE99/00615

§ 371 (c)(1), (2), (4) Date: Sep. 19, 2000

(87) PCT Pub. No.: WO99/48084

PCT Pub. Date: Sep. 23, 1999

(30) Foreign Application Priority Data

Mar. 19, 1998 (DE) ........................................ 198 12 207

(51) Int. Cl.[7] ......................... G10L 15/20; G10L 21/02; G10L 11/06

(52) U.S. Cl. ....................... 704/246; 704/133; 704/266; 704/208; 704/214

(58) Field of Search ................................ 704/246, 201, 704/204, 212, 220, 203, 226, 218, 233, 214, 208; 381/318

(56) References Cited

U.S. PATENT DOCUMENTS

| | | | | |
|---|---|---|---|---|
| 4,185,168 A | * 1/1980 | Graupe et al. | 381/318 |
| 4,888,806 A | * 12/1989 | Jenkin et al. | 704/201 |
| 5,303,374 A | * 4/1994 | Mitsuhashi et al. | 704/212 |
| 5,323,337 A | * 6/1994 | Wilson et al. | 704/203 |
| 5,479,560 A | 12/1995 | Mekata | |
| 5,956,686 A | * 9/1999 | Takashima et al. | 704/220 |
| 6,141,637 A | * 10/2000 | Kondo | 704/204 |

FOREIGN PATENT DOCUMENTS

| | | | |
|---|---|---|---|
| DE | AS 1 156 996 | 11/1962 | G01H/1/01 |
| EP | 0 763 810 | 3/1997 | G10L/3/02 |

OTHER PUBLICATIONS

G. Whipple, "Low Residual Noise speech Enhancement Utilizing Time–Frequency Filtering", ICASSP '94, IEEE International Conference on Acoustics, speech and Signal Processing, Adelaide, Australia, Apr. 19–22, 1994, vol. 1, pp. 5–8.

A. Hauenstein, "Optimierung von Algorithmen und Entwurf eines Prozessors fur die automatische Spracherkennung" [Optimization of algorithms and design of a processor for automatic voice recognition], Chair of Integrated Circuits, Technical University of Munich, Dissertation, Chapter 2, Jul. 19, 1993, pp. 13–26.

S.G. Mallat, "A Theory for Multiresolution Signal Decomposition: The Wavelet Representation", IEEE Trans. On Pattern Analysis and Machine Intelligence, vol. 11, No. 7, Jul. 1989, pp 674–693.

* cited by examiner

*Primary Examiner*—Richemond Dorvil
*Assistant Examiner*—Daniel A. Nolan
(74) *Attorney, Agent, or Firm*—Bell, Boyd & Lloyd LLC

(57) ABSTRACT

A method and an apparatus for processing a sound signal in which a useful signal and an interference signal are specified, the sound signal being transformed into the frequency domain and a change in the profile of the frequency being represented by an envelope for at least one frequency over a time. By segmenting the envelope, a maximum is obtained for each segment, the smallest maximum, weighted by a factor, being subtracted from the sound signal. It is also possible to take account of the minimum for the purpose of reducing the interference signal.

8 Claims, 4 Drawing Sheets

METHOD AND APPARATUS FOR PROCESSING A SOUND SIGNAL

BACKGROUND OF THE INVENTION

The present invention relates to a method and an apparatus for processing a sound signal.

A voice recognition system is disclosed in A. Hauenstein, "Optimierung von Algorithmen und Entwurf eines Prozessors für die automatische Spracherkennung" [Optimization of algorithms and design of a processor for automatic voice recognition], Chair of Integrated Circuits, Technical University of Munich, Dissertation, Chapter 2, Jul. 19, 1993, pp. 13–26, which also contains a basic introduction to components of the voice recognition system and important techniques which are customary in the context of voice recognition.

A wavelet transformation is disclosed in S. G. Mallat, "A Theory for Multiresolution Signal Decomposition: The Wavelet Representation", IEEE Trans. on Pattern Analysis and Machine Intelligence", Vol. 11, No. 7, July 1989, pp. 674–693. A wavelet transformation is preferably effected in a number of transformation stages, where a transformation stage subdivides a pattern into a high-pass filter component and a low-pass filter component. The respective high-pass and low-pass filter component preferably has a reduced resolution compared with the pattern (technical term: subsampling, i.e. reduced sampling rate, consequently reduced resolution). The pattern can be reconstructed from the high-pass and low-pass filter components. This is ensured in particular by the specific form of the transformation filters used during the transformation. The wavelet transformation can be effected one-dimensionally, two-dimensionally or multi-dimensionally.

A sound signal comprises a useful signal and an interference signal, the intensity of the interference signal depending on the surroundings. For further processing of the sound signal, it is an essential precondition that the useful signal be isolated from the interference signal.

Methods are known which suppress different regions of a frequency spectrum of the sound signal to a greater or lesser extent. In this case, it is disadvantageous that a dynamic development of the interference signal is not taken into account.

SUMMARY OF THE INVENTION

It is an object of the present invention to provide a method and an apparatus which ensure processing of a sound signal in such a way that the disadvantage described above is avoided.

This object is achieved in accordance with the present invention in a method for processing a sound signal, said method comprising the steps of: transforming said sound signal into the frequency domain; determining an envelope of the transformed sound signal over a time period for at least one prescribed frequency; subdividing the envelope into a first number of segments each determined by a prescribed duration; determining a maximum of the envelope for each segment of the first number of segments; determining a smallest maximum of said determined maximums for a second number of segments of said first number of segments; weighting the smallest maximum by a factor; and processing the sound signal by subtracting the weighted smallest maximum from the sound signal.

In an embodiment, the method further comprises the steps of: determining a minimum for a third number of segments of the first number of segments; and combining the smallest maximum with the minimum, and wherein the sound signal is processed by the subtracting the combined smallest maximum and minimum from the sound signal.

With a transformation of a temporal signal into a frequency domain, e.g. by means of fast Fourier transformation (FFT), a region of the temporal signal which comprises a prescribed number of samples is transformed into the frequency domain. This operation is effected for different instants, with the result that, as time progresses in the frequency domain, the individual frequencies produce different values, dependent on the respective transformed region of the temporal signal. In this way, it is possible to represent the profile of a frequency over the time.

In addition to the FFT, it is also possible to use a wavelet transformation or any other transformation for mapping the time domain into the frequency domain.

A method for processing a sound signal is specified in which the sound signal is transformed into a frequency domain. An envelope of the sound signal that has been transformed into the frequency domain over the time is determined for at least one prescribed frequency of the sound signal. The envelope is subdivided into a quantity of segments each determined by a prescribed duration. A maximum of the envelope is determined for each segment of the quantity of segments. The smallest maximum is determined for a prescribed number of the segments of the quantity of segments. The sound signal is processed by the smallest maximum, weighted by a factor, being subtracted from the sound signal.

The smallest maximum is thus advantageously specified, over a predetermined duration for the respective frequency whose envelope is determined over the time, the smallest maximum preferably encompassing the interference signal in a sound signal comprising a useful signal and an interference signal. This is manifested in particular when the sound signal is naturally spoken speech. In this case, the speech comprises a number of words which comprise, even with fluent articulation, points exhibiting spectral minima (in particular gaps between the individual words). In such points exhibiting spectral minima, the useful signal is virtually absent, whereas the interference signal is dominant.

Another advantage consists in the fact that the smallest maximum is determined for the number of the segments. In this case, the number of segments comprise a dynamic profile of the interference signal over the time. Thus, the interference signal may be an engine noise in a motor vehicle, which motor vehicle accelerates continuously over a period of time. The interference signal in the motor vehicle thus increases over the time (during the acceleration). Since the smallest maximum is determined in each case for the number of the segments, the smallest maximum is determined (anew) over the time for each number of the segments, with the result that the dynamic development of the interference signal can be concomitantly taken into account.

In a embodiment, a minimum is determined for a further number of the segments of the quantity of segments, and the sound signal is processed by the smallest maximum, combined with the minimum, being subtracted from the sound signal.

Taking account of the minimum which is determined for a further number of the segments proves to be extremely advantageous for the adaptation of the interference signal which is to be subtracted from the sound signal, in order to obtain the useful signal. If in an embodiment precisely no useful signal is present, the minimum identifies the interference signal and is therefore subtracted from the sound signal.

In an embodiment the minimum and the smallest maximum are combined in accordance with the following relationship:

$$a+b\max/\min,$$

where a designates a first prescribed coefficient, b designates a second prescribed coefficient, max designates the smallest, and min designates the minimum.

In this case, the coefficients should be prescribed in such a way that the interference signal is reduced in a favorable manner for the application.

In an embodiment, in each case after the number or the further number of segments has elapsed, updating is carried out in such a way that an updated interference signal is subtracted from the sound signal.

In an embodiment, the sound signal is a voice signal, preferably naturally spoken speech.

In an embodiment, the processed sound signal to be used for voice recognition purposes. A clear useful signal, as far as possible with no interference signal components, is an advantageous precondition precisely for a voice recognition system. Thus, the voice recognition system recognizes the spoken speech all the better, the clearer the useful signal is. Furthermore, the useful signal can also be output.

The object of the invention is also achieved in an apparatus for processing a sound signal comprising: a processor unit for: transforming said sound signal into the frequency domain; determining an envelope of the transformed sound signal over a time period for at least one prescribed frequency; subdividing the envelope into a first number of segments each determined by a prescribed duration; determining a maximum of the envelope for each segment of the first number of segments; determining a smallest maximum of said determined maximums for a second number of segments of said first number of segments; weighting the smallest maximum by a factor; and processing the sound signal by subtracting the weighted smallest maximum from the sound signal.

In an embodiment, the processor unit is further for: determining a minimum for a third number of segments of the first number of segments; and combining the smallest maximum with the minimum, and wherein the sound signal is processed by the subtracting the combined smallest maximum and minimum from the sound signal.

In an embodiment, an apparatus for processing a sound signal is specified, which has a processor unit which can be set up in such a way that the sound signal can be transformed into a frequency domain. An envelope of the sound signal that has been transformed into the frequency domain over the time can be determined for at least one prescribed frequency. The envelope can be subdivided into a quantity of segments each determined by a prescribed duration. A maximum of the envelope is determined for each segment of the quantity of segments. The smallest maximum is determined for a number of the segments of the quantity of segments. The sound signal is processed by the smallest maximum, weighted by a factor, being subtracted from the sound signal.

In an embodiment, processor unit is set up in such a way that a minimum is determined for a further number of the segments of the quantity of segments, and that the sound signal is processed by the smallest maximum, combined with the minimum, being subtracted from the sound signal.

The apparatus is particularly suitable for carrying out the method according to the invention or ones of its embodiments explained above.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1A:
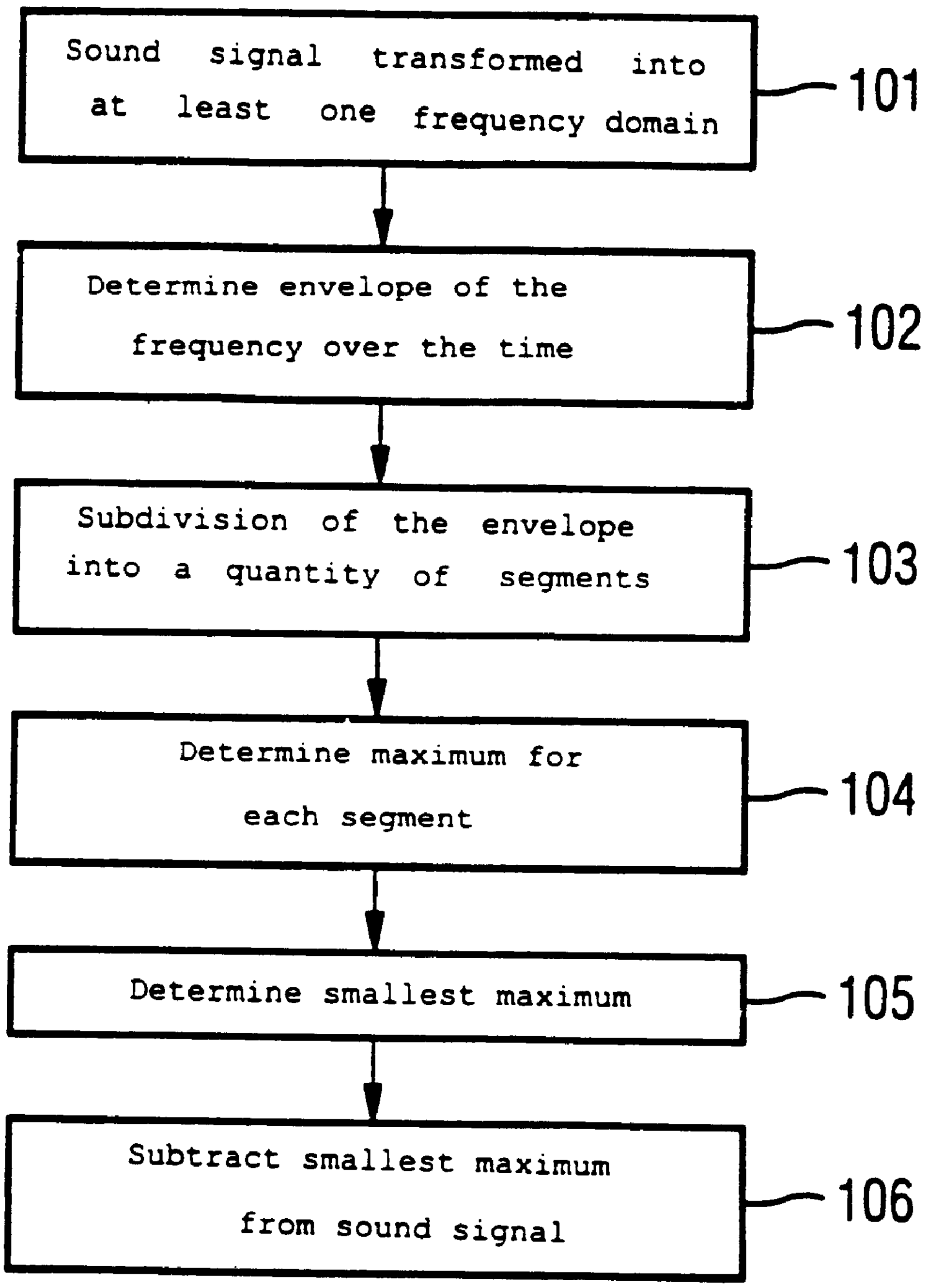
FIGS. 1*a* and 1*b* show block diagrams having steps of a method for processing a sound signal.
Figure 1B:
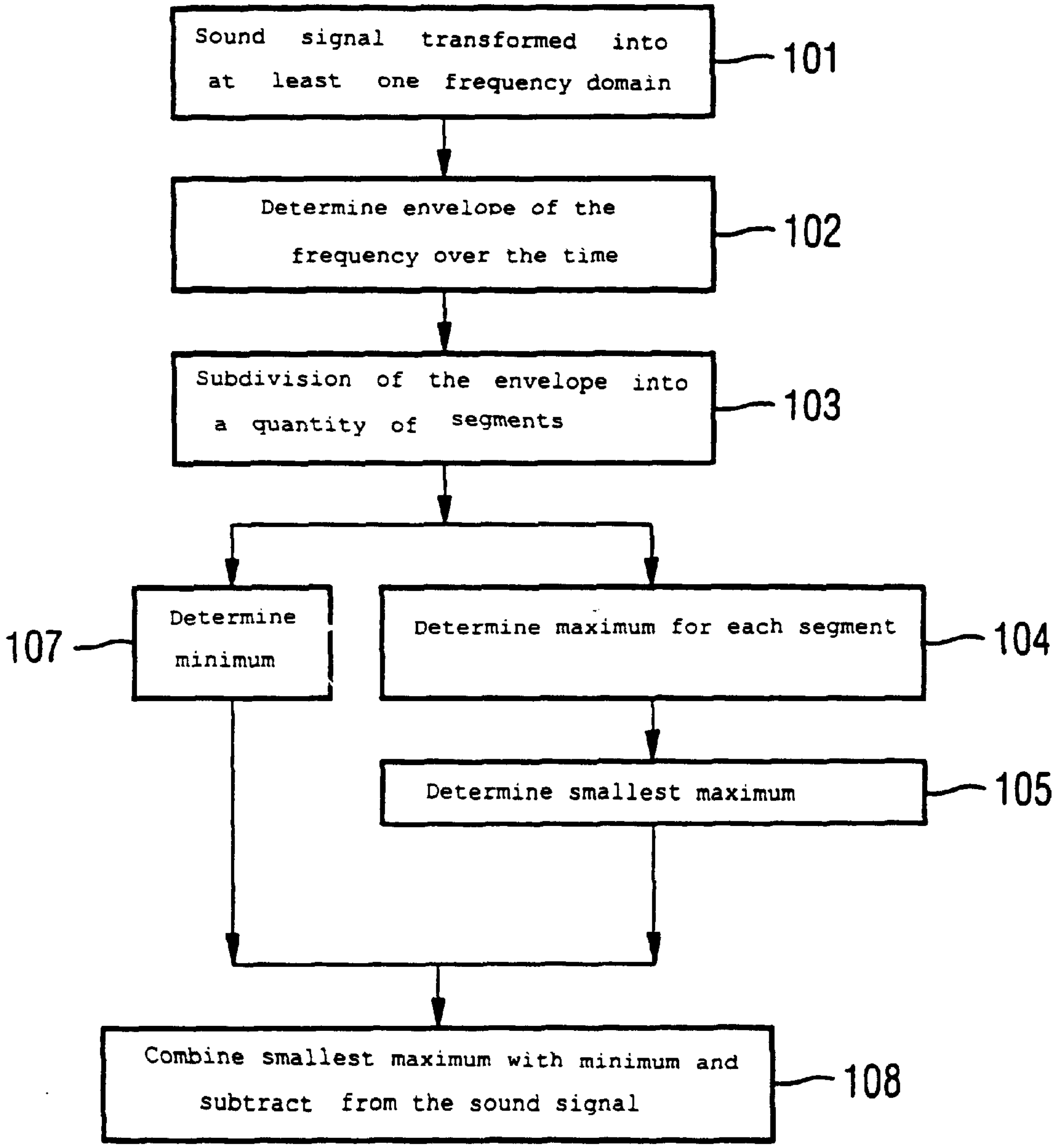

FIGS. 1*a* and 1*b* show block diagrams having steps of a method for processing a sound signal. Two variants for processing the sound signal are explained below with reference to these figures.

In FIG. 1*a*, the sound signal is transformed into at least one frequency domain (cf. step 101). This transformation is preferably a fast Fourier transformation (FFT). In this case, the transformation is carried out at specific instants $t_i$ and a profile of at least one frequency over the instants $t_i$ is thus determined. By means of this time-dependent profile of the frequency, an envelope is determined in a step 102. This is carried out for at least one frequency, in particular for a number of significant frequencies of the sound signal. In a step 103, the envelope representing the respective frequency is subdivided into a quantity of segments, which segments preferably have the same duration. A maximum in the profile of the envelope is determined for each segment (cf. step 104). In a step 105, the smallest maximum of a prescribed number of segments is determined and this smallest maximum, in particular weighted by a factor, is subtracted from the sound signal, in order, in this way, to reduce the interference signal and to ensure the strongest possible useful signal (cf. step 106). In this case, the smallest maximum is determined for a specific number of previous segments, updating being carried out anew after a prescribed time for the smallest maximum, taking account of the number of previous segments which is prescribed with respect to this new time. What is effected, then, is dynamic adaptation of the smallest maximum for the envelope of the respective frequency over the time at all instants given by the number N of previous segments. An example which illustrates the necessity of dynamic adaptation of the interference signal is the interference signal in an accelerating vehicle, in which an engine noise increases in accordance with the acceleration over the time. The interference signal corresponding to the increasing engine noise is adapted by updating the smallest maximum at prescribed instants for the envelope of prescribed frequencies, in order to obtain a high-quality useful signal from the sound signal.

FIG. 1*b* shows the blocks 101, 102, 103, 104 and 105 in accordance with FIG. 1*a*. In this case, after step 103, in addition to the determination of the maximum (104 and 105), a minimum over a prescribed time of the envelope of the frequency that is being investigated in each case is determined (cf. step 107). What is of particular interest in this case is the (smallest) minimum over a prescribed number of previous segments, that is to say the minimum emerging from the envelope from an instantaneous instant for a duration that is to be taken into account. Finally, in a step 108, both the smallest maximum and the minimum are combined with one another, in order to obtain an interference signal that is to be subtracted from the sound signal, and thus to decisively improve the quality of the useful signal.

The minimum is combined with the smallest maximum in accordance with the following relationship:

$$a + b \cdot \frac{\max}{\min},$$

where a designates a first prescribed coefficient, b designates a second prescribed coefficient, max designates the smallest maximum, and min designates the minimum.

Afterwards $$\hat{S} = X - \left(a + b\frac{\max}{\min}\right) \cdot \hat{N}$$

is preferably calculated, where $\hat{S}$ designates the new sound signal (from which the interference has been removed), X designates the sound signal exhibiting interference, and $\hat{N}$ designates an estimated noise value or a value which is strongly correlated with the noise.

This combination also takes account of the temporal variation of the interference signal. If a constant interference signal is superposed on the useful signal exactly, this interference signal or a component proportional thereto is eliminated.

The time interval T which has to be taken into account in order to define the minimum and, if appropriate, also the smallest maximum and identifies the duration of the number of previous segments is chosen in particular in such a way that this time interval T is longer than a spoken word (in this case, the sound signal corresponds to naturally spoken speech). The updating of the minimum and/or of the smallest maximum is effected at instants t=n*T, that is to say every n time intervals T.

Figure 2:
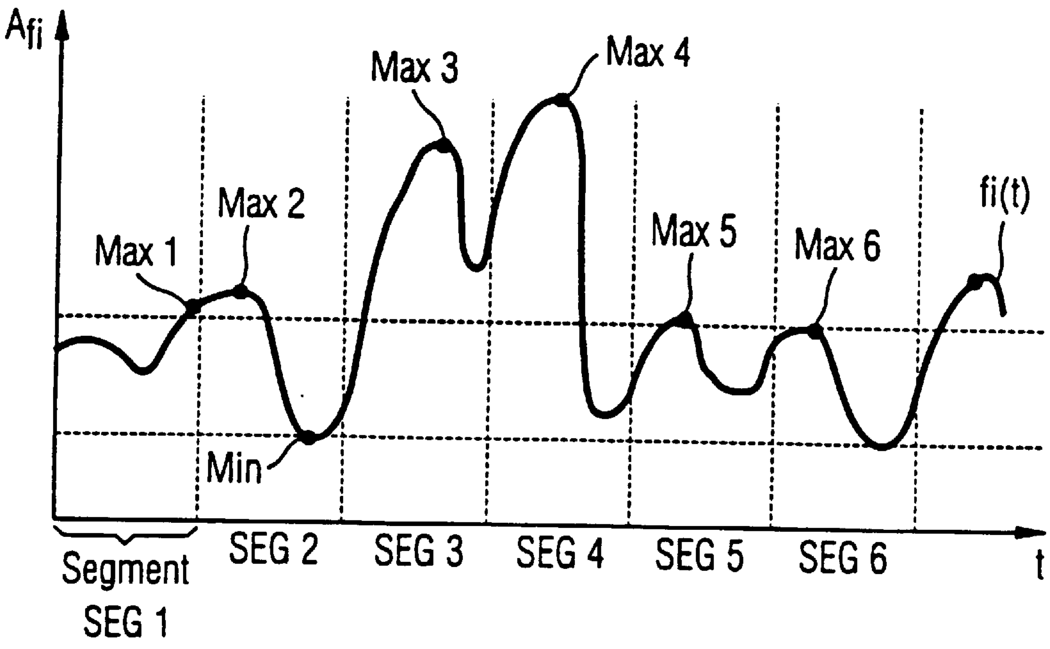
FIG. 2 shows a profile of an envelope $f_i^H(t)$ of a frequency $f_i$ over the time t.

FIG. 2 shows a profile of an envelope $f_i^H(t)$ of a frequency $f_i$ over the time t. An amplitude $A_{fi}$ of the frequency $f_i$ is plotted on the ordinate and the time t is plotted on the abscissa. A profile of the envelope $f_i^H(t)$ over the time t is also illustrated. The time axis t is subdivided into segments $SEG_i$, where i represents a time variable. The segments SEG1, SEG2, . . . , SEG6 are plotted by way of example in FIG. 2. A maximum $Max_i$, which in each case represents a maximum—referring to the respective segment $SEG_i$—of the envelope $f_i^H(t)$ of the frequency $f_i$ over the time t, is determined for each segment $SEG_i$. The maxima Max1, Max2, . . . , Max6 are produced. The smallest of the maxima is then determined, maximum Max6 from segment SEG6 in the example. The minimum Min of the segments $SEG_i$ illustrated lies in segment SEG2. The smallest maximum Max6 that has been determined in this way and the minimum Min are combined with one another in the manner described above and subtracted from the sound signal, that is to say the frequency $f_i$, in order to improve the useful signal (once again referring to the frequency $f_i$).

In particular, a weighted average of smallest maximum and minimum is subtracted from the sound signal (referring to the respective frequency $f_i$ to be taken into account).

Furthermore, the smallest maximum and the minimum are determined at an instant $t_{akt}$ taking account of a prescribed number N of segments before this instant $t_{akt}$. By adapting the interference signal that is to be subtracted from the sound signal, the smallest maximum and the minimum (over the previous N segments) are determined anew at different instants $t_{akt}$, combined with one another and subtracted from the useful signal (referring to the respective frequency $f_i$).

FIG. 2 shows, by way of example, the envelope $f_i^H(t)$ for a prescribed frequency $f_i$. After transformation (e.g. after the performance of an FFT) of the sound signal x(t) into the frequency domain, exactly one value of an amplitude $A_{f_i}$ is obtained at the respective instant t for each frequency $f_i$. The profile of the frequency $f_i(t)$ over the time t is produced by transformations into the frequency domain which are carried out at different instants t. The temporal profile of a prescribed frequency $f_i(t)$ is obtained in this way. The envelope $f_i^H(t)$ is determined by means of this temporal profile of the frequency $f_i(t)$. This envelope $f_i^H(t)$ is illustrated in FIG. 2. In particular, an envelope $f_i^H(t)$ is determined in each case for a number of frequencies $f_i$, with the result that the invention is applied to a number of envelopes $f_i^H(t)$, which represent the profile of a number of frequencies $f_i$ over the time, and a considerable improvement of the sound signal is thus achieved by the interference signal that has been determined being subtracted from a sound signal containing information.

Figure 3:
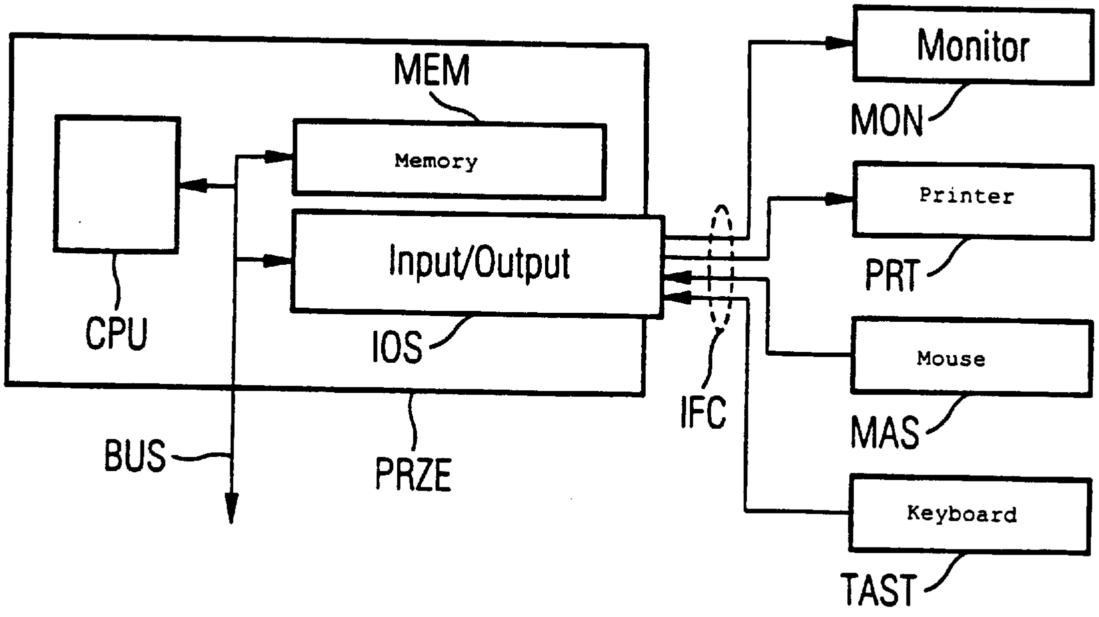
FIG. 3 is a schematic block diagram of a processor unit.

FIG. 3 illustrates a processor unit PRZE. The processor unit PRZE comprises a processor CPU, a memory SPE and an input/output interface IOS, which is utilized in different ways via an interface IFC: via a graphical interface, an output is made visible on a monitor MON and/or is output on a printer PRT. An input is effected via a mouse MAS or a keyboard TAST. The processor unit PRZE is also provided with a data bus BUS, which ensures the connection of a memory MEM, the processor CPU and the input/output interface IOS. Furthermore, additional components, e.g. additional memory, data storage device (hard disk) or scanner, can be connected to the data bus BUS.

Figure 4:
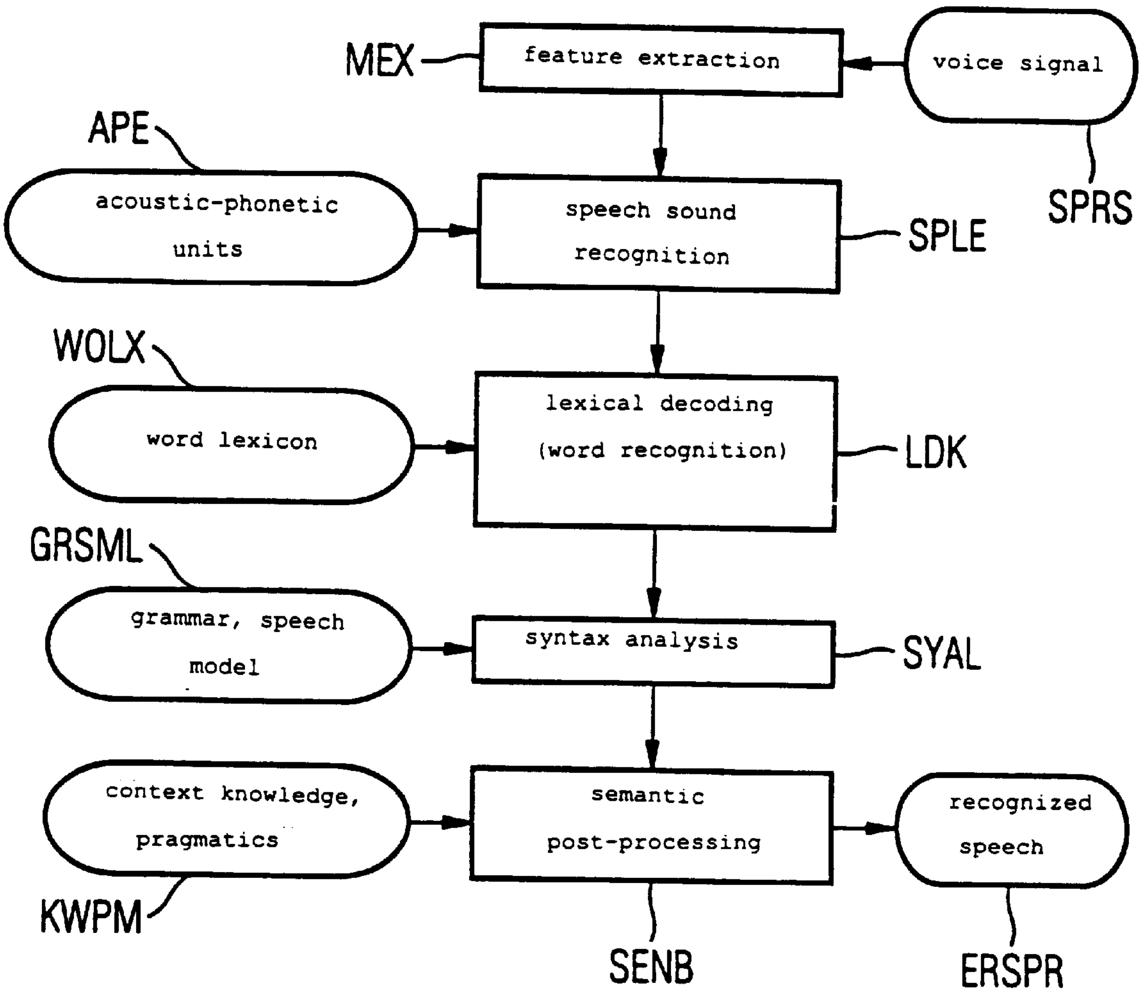
FIG. 4 is a block diagram of a voice recognition system.

FIG. 4 shows a voice recognition system. A suitable formalism for knowledge representation is a precondition for the recognition of naturally spoken speech. A complete voice recognition system comprises a plurality of processing levels. These are, in particular, acoustics-phonetics, intonation, syntax, semantics and pragmatics. FIG. 4 demonstrates the processing levels during recognition (cf. A. Hauenstein, "Optimierung von Algorithmen und Entwurf eines Prozessors für die automatische Spracherkennung", Chair of Integrated Circuits, Technical University of Munich, Dissertation, Chapter 2, Jul. 19, 1993, pp. 13–26—therefore.).

The natural voice signal SPRS passes into the voice recognition system, where feature extraction is carried out in a component MEX. After the feature extraction, speech sounds are recognized using known acoustic-phonetic units APE (see block SPLE). This involves the calculation of acoustic distance parameters. The speech sound recognition SPLE is followed by the lexical decoding (word recognition) in a block LDK with the aid of the articulation model or word lexicon WOLX and then afterwards a syntax analysis SYAL with the aid of the speech model, including the grammar, GRSML. The word recognition LDK and the syntax analysis SYAL represent the search for a correspondence for the voice signal. Finally, semantic post-processing is carried out in a block SENB, where context knowledge and pragmatics KWPM are taken into account, and the speech ERSPR recognized by the voice recognition system finally follows.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for processing a sound signal, said method comprising the steps of:

transforming said sound signal into the frequency domain;

determining an envelope of the transformed sound signal over a time period for at least one prescribed frequency;

subdividing the envelope into a first number of segments each determined by a prescribed duration;

determining a maximum of the envelope for each segment of the first number of segments;

determining a smallest maximum of said determined maximums for a second number of segments of said first number of segments;

weighting the smallest maximum by a factor; and processing the sound signal by subtracting the weighted smallest maximum from the sound signal.

2. The method as claimed in claim 1, further comprising the steps of:

determining a minimum for a third number of segments of the first number of segments; and combining the smallest maximum with the minimum, and wherein the sound signal is processed by the subtracting the combined smallest maximum and minimum from the sound signal.

3. The method as claimed in claim 2, wherein the weighted smallest maximum and the minimum are combined in accordance with the following relationship:

$$a + b \cdot \frac{\max}{\min},$$

wherein a is a first prescribed coefficient, b is a second prescribed coefficient, max is the smallest maximum, and min is the minimum.

4. The method as claimed in claim 2, wherein the sound signal is processed in each case after the second number of segments or the third number of segments has elapsed.

5. The method as claimed in claim 1, wherein the sound signal is a voice signal.

6. The method as claimed in claim 1, wherein the processed sound signal is for voice recognition purposes.

7. An apparatus for processing a sound signal comprising:

a processor unit for:

transforming said sound signal into the frequency domain;

determining an envelope of the transformed sound signal over a time period for at least one prescribed frequency;

subdividing the envelope into a first number of segments each determined by a prescribed duration;

determining a maximum of the envelope for each segment of the first number of segments;

determining a smallest maximum of said determined maximums for a second number of segments of said first number of segments;

weighting the smallest maximum by a factor; and processing the sound signal by subtracting the weighted smallest maximum from the sound signal.

8. The apparatus as claimed in claim 7, wherein the processor unit is further for:

determining a minimum for a third number of segments of the first number of segments; and combining the smallest maximum with the minimum, and wherein the sound signal is processed by the subtracting the combined smallest maximum and minimum from the sound signal.

* * * * *